Oct. 14, 1947.　　　G. B. HANSBURG　　　2,428,935
BABY STROLLER
Filed Oct. 18, 1945　　　3 Sheets-Sheet 1

INVENTOR
George B. Hansburg
BY
Edward Thomas
ATTORNEY

Oct. 14, 1947.  G. B. HANSBURG  2,428,935
BABY STROLLER
Filed Oct. 18, 1945  3 Sheets-Sheet 2

INVENTOR
George B. Hansburg
BY
Edward Thomas
ATTORNEY

Oct. 14, 1947.  G. B. HANSBURG  2,428,935
BABY STROLLER
Filed Oct. 18, 1945    3 Sheets-Sheet 3

INVENTOR
George B. Hansburg
BY
Edward Thomas
ATTORNEY

Patented Oct. 14, 1947

2,428,935

UNITED STATES PATENT OFFICE 2,428,935

BABY STROLLER

George B. Hansburg, Brooklyn, N. Y.

Application October 18, 1945, Serial No. 623,069

20 Claims. (Cl. 155—22)

This invention relates to baby strollers and is herein described in some detail as embodied in a stroller adapted also to serve as a baby walker.

Devices of this sort are well known and endeavors have been made to make them light by building them of sheet metal, or by building them largely of wood, but most baby strollers hitherto made have weighed at least twenty-four pounds. Moreover, they are complicated in design, often adapted to be folded up so that many joints had to be accurately made and they could not be well built in assembly line procedures because the sheet metal did not furnish accurate mounting for bearings and for the uniting of various parts. In the endeavor to lighten the structure sometimes springs were eliminated with the result that the child in the stroller was badly jolted on rough pavement.

According to the present invention the foregoing and other disadvantages and objections are overcome and a stroller is provided which is light and strong and comfortable for the child and well adapted to be built by assembly line procedures.

In the form disclosed herein in some detail the stroller is well adapted to be made largely of magnesium metal with parts so designed that they may be made of magnesium die castings in which accurately bored openings, or other faces are easily provided and are well adapted to be accurately and rapidly machined before being assembled. Thus, a device is capable of being built which weighs no more than fourteen lbs. is built of readily assembled parts and parts that are easily made.

Because of this structure the stroller possesses an inherent rigidity making it possible to make it very compact and capable of being carried almost as easily as a typical week-end packed suitcase. Moreover, the structure is such that it conforms to the recommendation of psychologists and pediatricians by giving the child adequate support without likelihood of chafing itself.

The seat is adapted to be so mounted in the otherwise rigid frame that its spring and other supports may be readily adjusted to meet the needs of changing height of a growing child.

In the form shown a positively held pushing handle is pivoted at the rear and is adapted to be released by a latch and turned down on its pivot to fit over the top front cross part of the device, thus forming a grip for the child when learning to walk.

Other features and advantages will hereinafter appear.

Figure 1:
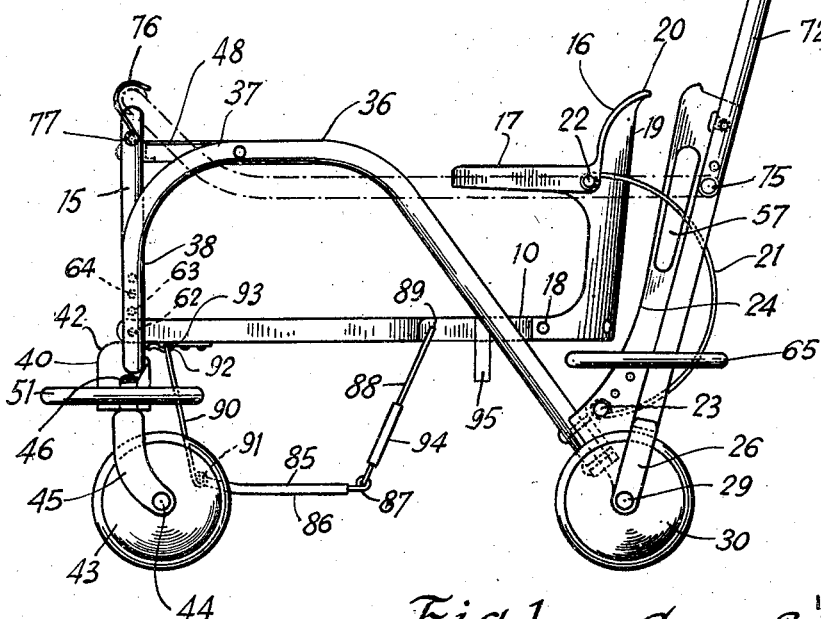
Fig. 1 is a side view of one embodiment of the invention.
Figure 3:
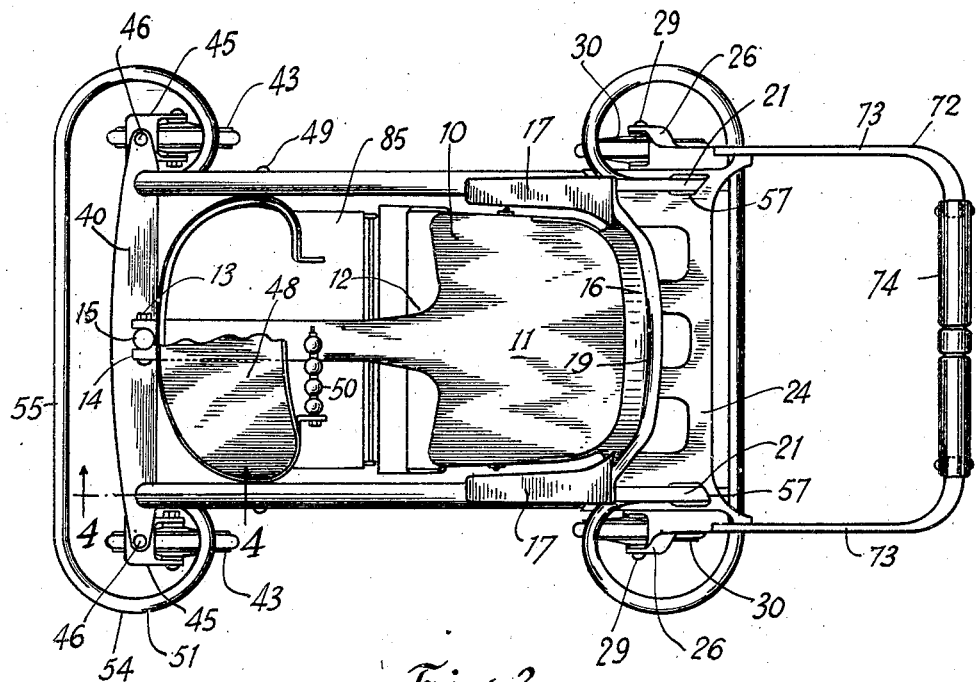
Fig. 3 is a plan view of the same.
Figure 4:
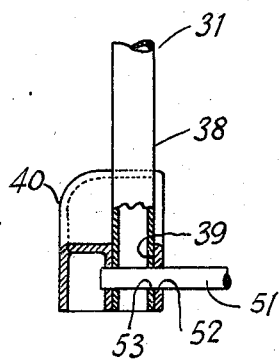
Fig. 4 is a section of the broken line 4—4 of Fig. 3.

In the device shown in Figs. 1 and 3, a wooden seat 10 made from a relatively wide board where the child sits on it at 11 and narrowing rapidly in front at 12 where the child straddles it, is supported in front by a bolt 13 passing through the front end 14 of the board so as to hold the board to an upright post 15. The back 16 of the seat is shown as a thin die cast magnesium curved plate having integral arms 17 in the shape of inverted U's to form rests for the arms of the child and bolted, or held by screws 18 to the board 19.

The back 16 is shown as of very thin metal where it curves around at 19 to fit the back of the child and having a strengthening edge rib 20 springing up from the arms and around the back at the top.

The seat 10 is shown as suspended by a spring 21 at each side in the form of a long bent leaf which embraces a bolt 22 crossing the arm 17 where the arm 17 joins the rest of the back 19.

The springs 21 embrace bolts 23 at their lower end, the bolt being carried in a skeleton back frame 24 which curves around behind the back 16 in a somewhat flatter curve than the back and forms a back rear frame for the stroller.

In the form shown the back frame 24 includes a fork 26 at each side, said forks including bores 27 at their thicker outer end 28 in each side of the fork to support the axles 29 of the rear wheels 30. The back frame 24 is also machined at 32 as best seen in Fig. 7, to receive the ends of hollow tubes 31 which form the frame of the stroller, and form convenient arm grips for the child.

Figures 7, 8:
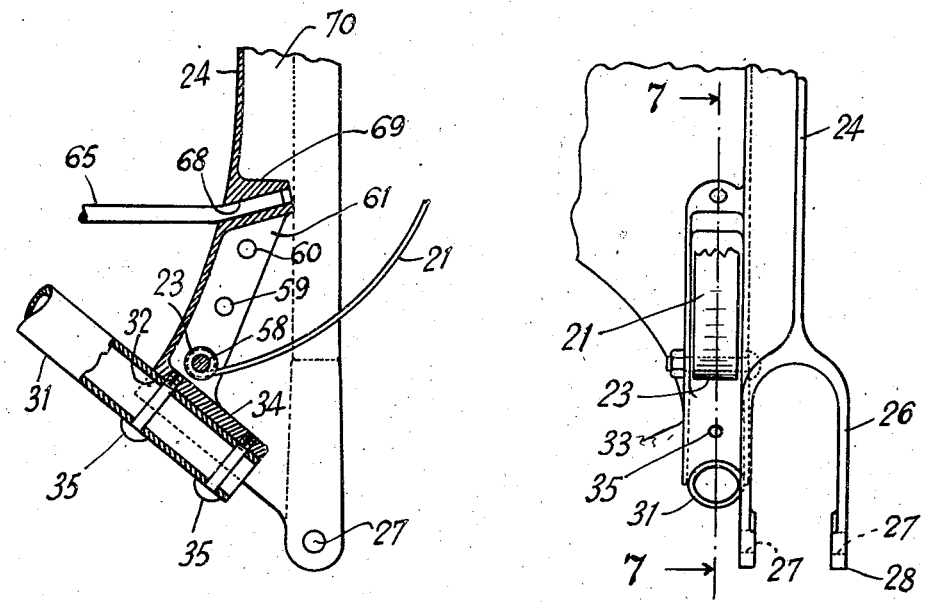
Fig. 7 is a side view largely broken away showing the spring mounting and buffer mounting near one rear wheel on the line 7—7 of Fig. 8.
Fig. 8 is a rear view on an enlarged scale of the parts seen in Fig. 7.

In the form shown the tubes 31 each lie in a substantially half round machined section 33 at the machined surface 32, said section being thickened as shown at 34 in Fig. 7 to give strength and adequate hold to bolts 35 which pass through the tube 31 and are threaded into the thickened section 34. It may here be pointed out that the back frame 24 is well adapted to be die cast of metal magnesium and to be finished by easy machining operations.

The tube 31 rises at an angle of about 45° until it is slightly higher than the arm 17 when it bends horizontal at 36 and then continues horizontal until it bends down at a point 37 in a reach 38, which finally enters a machined opening 39 in a thickened internal boss of a front cross frame 40. The front cross frame 40 is shown as seen an arch-shaped member extending between the two side tubes 31 and somewhat beyond them at 41 and is curved downwardly in front at 42 so that it forms a strong thin arched-over plate well adapted to be made as a magnesium metal die casting.

Figure 2:
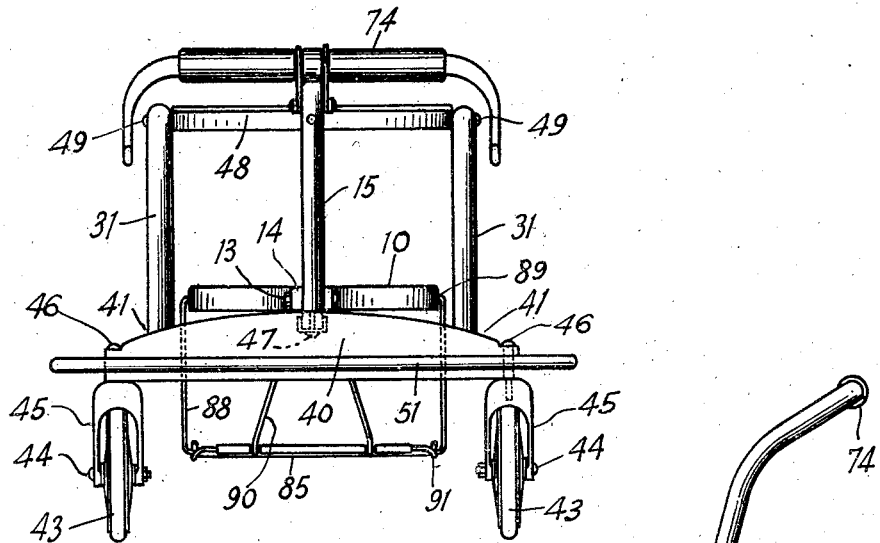
Fig. 2 is a front view of the same.

The front of the stroller is shown as supported by wheels 43 journaled at 44 in short cross shafts extending across a die cast magnesium fork 45 swivelled to swing on a pivot 46 in the extensions 41. The die casting 40 is well adapted to have the upright tubing 15 held to it by an internal bolt 47 as seen in Fig. 2, thus providing a strong light rigid structure for the front of the stroller.

The post 15 is shown as rising a little higher than the bend 37 in the tube 31 and as supporting a tray 48 for the child, said tray being bolted at 49 to each tube 31. The tray may be provided with the usual vari-colored balls 50. In the form shown the tube 31 is held in place in the front cross piece 40 by the buffer tube 51 which passes through openings 52, 53 in each tube and webs within the end of the cross piece 40, being pushed in from the rear and making a tight fit. The buffer tube 51 is bent around at 54 to form a front buffer 55 which is usually rubber covered.

In the form shown the springs 21 pass through elongated openings 57 in the back frame 24 so that they normally spring clear of the sides of the openings 57 and these openings enable the pivot 23 of the spring 21 to be set in any one of the openings 58, 59, 60 in a web 61 of the back frame 24, thus adjusting the height of the seat 10 by altering the height of the pivot 23 which carries it.

The front post 15 is shown as provided with similar openings 62, 63, 64 for correspondingly adjusting the height of the seat in front. So the seat may be kept level. It will be noted that these adjustments are adapted to be made by an ordinary householder.

The stroller is provided at the back with a rubber-covered back bumper 65 which is shown as mounted in openings 68 on the front side of the back frame 24. The frame being provided with internal lugs 69 for this purpose. The rear bumper 65 is shown as bent around the outside of the springs 21 and across the back and is adapted to be pushed in as a tight fit. The back 24 is shown as stiffened along its outer edge by a web 70 which rises upwardly slanting somewhat rearwardly to an upper depression 71 where it is adapted to form a support for a pivoted handle 72. The handle 72 is conveniently made of magnesium metal die casting having separate sides 73 and a central handle on 74 connecting the sides 73. The handle 72 is shown as pivoted at 75 in the depression 71 of the back frame 24 and the pivots are so located and the length of the handle is such that when it swings forward on its pivots 75 it rests on the top of the post 15 and may be hooked down by swinging over it a hook, or hooks 76 pivoted at 77 near the top of the post 15.

Figures 5, 6:
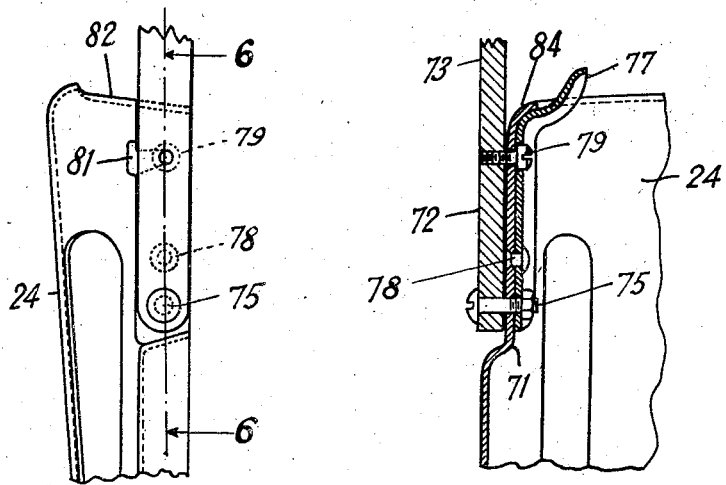
Fig. 5 is an enlarged view of a latch for holding the pushing handle upright.
Fig. 6 is a sectional view of the line 6—6 of Fig. 5.

In order to hold the handle normally in pushing position there is shown a latch adapted to be released by a handle 77 adapted to be sprung out on its rivet 78 so as to no longer catch around the head of a screw 79 threaded into the handle 72. To release the handle 72 the latch 77 is swung inward to the right in Fig. 6 free of the screw head 79 through the opening 81 near the top 82 of the rear frame 24 but beneath its strengthening edge roll 70 so that the strength of the back plate is not weakened at this point.

To hold the handle 73 the latch 77 normally rests in the curved corner 84 of the back plate 24 so that the handle cannot be moved forwardly because of the screw 79, or backwardly because it lies against the upper part of the back plate 24.

The device is shown as including a footrest 85 on which a child seated on the seat 10 may rest its feet. In the form shown the footrest includes a die cast magnesium bottom plate 86 carried by end wires 87 which are hooked onto wires 88 pivoted in the sides of the seat at 89 so that the plate 86 may swing backward with the wires 88 and rise until it underlies the seat 10.

Normally the plate 86 is held extended in a horizontal position near the ground by front wires 90 hooked to the wires 87 at 91 and forming a bail 92 which is adapted to be caught under a spring catch 93 underlying the front extension 14 of the seat 10. The wires 88 may be connected by a second plate 94 against which the heels of the child's feet may kick if desired.

When the bail 92 is released from the catch 93 its wires 90 fold down onto the plate 86 and so lie on the plate as it swings upward and backward guided by the wires 888 until its side catches on the detent 95 extending downwardly from the seat 10 and adapted to releasably hold the plate 85 and its wires 88 and 90.

As mentioned above, the principal parts of the device are made of die cast magnesium metal including the forks 45, back plate 24, back 19, front plate 42. The hollow tubes 36 may be drawn magnesium and also the post 15. The handle 72 also is mostly made of magnesium metal.

It is found that for a large part of the area of the parts named a thickness of $\frac{1}{16}$ in. is sufficient when strengthened by the edge ribs 20 and other ribs shown. As a result the device is as light as if its parts were made of thin plywood and are much stronger.

Usually most of the magnesium parts are painted. Lightness of the arms 17 is obtained by having them in form of inverted U's across which the bolts 22 extend if desired. The wheels may be facing disks of die cast magnesium, carrying rubber tires.

The back frame 24 is shown with five openings of which the openings 57 form end openings and the openings 96 form spaced intermediate openings thus facilitating die casting as well as lightening the weight of the completed structure.

Having thus described certain embodiments of the invention, what is claimed is:

1. In a device of the class described the combination with a rigid frame, of a seat with one end pivoted on the frame, springs anchored in the frame supporting the other end of the seat, front wheels on which the device runs, rear wheels on which the device runs, a curved thin cast metal plate forming a rear cross part of the frame near its rear wheels, a separate curved thin cast metal plate forming a front cross part of the frame near the front wheels and metal tubes connecting the cross plates to form the frame.

2. In a device of the class described the combination with a rigid frame, of a seat having a front extension, a front curved thin metal plate forming a front cross piece, a rear curved thin metal plate forming a rear cross piece, springs for the seat anchored in the rear cross piece in any of a plurality of openings therein, a post on the front cross piece, and a pivot for the front of the seat adapted to fit in any of a plurality of openings in the post.

3. In a device of the class described the combination with a seat, of a back for said seat of thin metal, a back plate of metal forming a cross frame having a thin web center, an integral fork on the frame at each side carrying supporting wheels for the device, and means at each side of the cross frame supporting said seat by said back.

4. In a device of the class described the combination with the seat, of a back for said seat of thin metal, a back plate of metal forming a cross frame having a thin web center, an integral fork at each side carrying supporting wheels for the device, means at each side of the cross frame supporting said seat by said back, and a handle pivoted at the upper end of said frame adapted to be latched into position and to swing forward on its pivot.

5. In a device of the class described the combination with a frame having a front and back, of side tubes forming the connection between the front and back of the frame, a thin metal curved back member forming part of the frame and having a thickened edge and thickened bosses for holding the said tubes, and an arched thin metal front frame member having thickened bosses holding said tubes.

6. In a device of the class described the combination with a frame having a front and back, of side tubes forming the connection between the front and back of the frame, a thin metal curved back member forming part of the frame and having a thickened edge and thickened bosses for holding the said tubes, an arched thin metal front frame member having thickened bosses holding said tubes, a seat, and supporting springs at the back of the seat springing from said back frame, a pivot for the seat near the front frame, said springs passing through openings in said rear frame.

7. In a device of the class described the combination with a frame having a front and back, of side tubes forming the connection between the front and back of the frame, a thin metal curved back member forming part of the frame and having a thickened edge and thickened bosses for holding said tubes, an arched thin metal front frame having thickened bosses holding said tubes, a seat having supporting springs at its back springing from said back frame, a pivot for the seat near the front frame, said springs passing through openings in said rear frame, a thin metal curved back for said seat having a thickened edge, and integral arms in the form of inverted U's extending from said back.

8. In a device of the class described the combination with a frame having a front and back, of side tubes forming the connection between the front and back of the frame, of a thin metal curved back member forming part of the frame and having a thickened edge and thickened bosses for holding said tubes, an arched thin metal front frame having thickened bosses holding said tubes, a seat, supporting springs at the back springing from said back frame, a pivot for the seat near the front frame, said springs passing through openings in said rear frame, a handle pivoted on the rear frame, and a post rising from the front frame upon which the handle is adapted to be swung on its pivot.

9. In a device of the class described the combination with the seat, of a back for said seat of thin metal, and a back plate of metal forming a cross frame having a thin web center and integral forks at each side and adapted to support said seat at varying heights supporting wheels for the device, carried by the forks, and a front post having various positions to which said seat is adapted to be attached.

10. In a device of the class described the combination with a seat, of a thin metal curved back frame having a thickened edge and thickened bosses, springs springing from said bosses for supporting the seat and passing through openings in the back frame, wheels journaled in extensions of said frame, a thin metal curved front frame, swivelled wheels supporting said front frame, and members springing from said bosses and engaging said front frame to form the frame of the device.

11. In a device of the class described the combination with a seat, of a thin metal curved back frame having a thickened edge and thickened bosses, springs springing from said bosses for supporting the seat and passing through openings in the back frame, wheels journaled in extensions of said frame, a thin metal curved front frame, swivelled wheels supporting said front frame, members springing from said bosses and engaging said front frame to form the frame of the device, a post on the front frame to which the seat is pivoted, and a handle pivoted on the rear frame for pushing the device and adapted to be swung over to rest on said post.

12. In a device of the class described the combination with a seat, of a thin metal curved back frame having a thickened edge and thickened bosses, springs springing from said bosses for supporting the seat and passing through openings in the back frame, wheels journaled in extensions of said frame, a thin metal curved front frame, swiveled wheels supporting said front frame, members springing from said bosses and engaging said front frame to form the frame of the device, a post on the front frame to which the seat is adjustably pivoted, and a handle pivoted on the rear frame for pushing the device and adapted to be swung over to rest on said post and means for positively holding the handle at the back frame.

13. In a device of the class described the combination with a seat, of a rear frame on which the seat is supported by springs, said rear frame consisting of a thin magnesium metal open work sheet having a thickened edge, bosses on said sheet, magnesium side tubes engaging said bosses to form a fore and aft frame, and a thin curved sheet magnesium front frame in which said tubes are anchored.

14. In a device of the class described the combination with a seat, of a rear frame on which the seat is supported by adjustably mounted springs, said rear frame consisting of a thin magnesium metal open work sheet having a thickened edge, bosses on said sheet, magnesium side tubes engaging said bosses to form a fore and aft frame, a thin curved sheet magnesium front frame in which said tubes are anchored, and a front post supported by said front frame, and a pivot adjustably supporting the seat on said post.

15. In a device of the class described the combination with a seat, of a thin sheet metal curved back frame having a strengthening edge and provided with openings for lightness in the sheet, springs adapted to be mounted in any one of a plurality of openings in said back frame and passing through wing side openings in said frame to support the seat, side tubes extending from said back frame and arched over, a hollow front frame having bosses in which said tubes are mounted, and a tube post mounted on said front frame on which the seat is pivoted.

16. In a device of the class described the combination with a seat, of a thin sheet metal curved back frame having a strengthening edge and provided with openings for lightness in the sheet, springs adapted to be mounted in any one of a plurality of openings in said back frame and passing through wing side openings in said frame to support the seat, side tubes extending from said back frame and arched over, a hollow front frame having bosses in which said tubes are mounted, a tube post mounted on said front frame on which the seat is pivoted, a footrest beneath the seat and adapted to swing thereon beneath it, a bail adapted to support the front of said footrest near said post, and a latch below the seat adapted to hold the foot rest folded up when released.

17. In a device of the class described the combination with a wooden seat, of a curved thin metal back having integral hollow side arms and a thickened edge, a curved rear back thin sheet metal frame having bosses, and springs supporting the seat anchored within the hollow arms and anchored on the bosses.

18. In a device of the class described the combination with a wooden seat, of a curved thin metal back having integral hollow side arms and a thickened edge, a curved rear back thin sheet metal frame having bosses, springs supporting the seat anchored within the hollow arms and anchored on the bosses, a thin sheet metal curved front frame, a post on said front frame, and a pivot supporting the front of the seat carried by said front frame.

19. A baby stroller having a seat and a foot rest, adapted to be swung out of the way, a pivoted pushing handle at the back, a front support on which the handle is adapted to rest when swung forward on its pivots and adapted to hold the handle whereby it may serve as a hand hold for a child standing on the ground with the foot rest out of the way.

20. A baby stroller having a seat and a foot rest adapted to be swung out of the way, a frame carrying front and rear wheels, a pivoted handle at the back, a front support on which the handle is adapted to rest when swung forward on its pivots and adapted to hold the handle whereby it may serve as a hand hold for a child standing on the ground with the foot rest out of the way, and tubes forming the side members of the frame adapted to serve as hand grips for the child.

GEORGE B. HANSBURG.

REFERENCES CITED

The following references are of record in the file of this patent:

UNITED STATES PATENTS

| Number | Name | Date |
|---|---|---|
| 1,151,414 | Steinbach | Aug. 24, 1915 |
| 1,793,848 | Gill et al. | Feb. 24, 1931 |
| 2,392,938 | McGregor | Jan. 15, 1946 |
| 1,737,618 | Siebert | Dec. 3, 1929 |